US011337039B2

(12) United States Patent
Paterour et al.

(10) Patent No.: US 11,337,039 B2
(45) Date of Patent: May 17, 2022

(54) COMMUNICATION NETWORK COMPRISING SIGNALLING GROUPS

(71) Applicant: AIRBUS DS SLC, Elancourt (FR)

(72) Inventors: Olivier Paterour, Guyancourt (FR); Pascal Laffitte, Sainte Geneviève des Bois (FR)

(73) Assignee: AIRBUS DS SLC, Elancourt (FR)

( * ) Notice: Subject to any disclaimer, the term of this patent is extended or adjusted under 35 U.S.C. 154(b) by 0 days.

(21) Appl. No.: 16/859,230

(22) Filed: Apr. 27, 2020

(65) Prior Publication Data
US 2020/0344577 A1 Oct. 29, 2020

(30) Foreign Application Priority Data
Apr. 25, 2019 (FR) ..................................... 1904388

(51) Int. Cl.
*H04W 4/00* (2018.01)
*H04W 4/08* (2009.01)
*H04W 4/90* (2018.01)
*H04W 4/10* (2009.01)

(52) U.S. Cl.
CPC .............. *H04W 4/08* (2013.01); *H04W 4/10* (2013.01); *H04W 4/90* (2018.02)

(58) Field of Classification Search
CPC .......... H04W 4/90; H04W 76/50; H04W 4/02
See application file for complete search history.

(56) References Cited

U.S. PATENT DOCUMENTS

| 2015/0358794 A1* | 12/2015 | Nokhoudian | H04W 4/90 |
| | | | 455/404.1 |
| 2018/0199179 A1* | 7/2018 | Rauner | G08B 25/10 |
| 2019/0279495 A1* | 9/2019 | Nishioka | G08B 25/10 |

OTHER PUBLICATIONS

Search Report as issued in French Patent Application No. 1904388, dated Oct. 24, 2019.
"Functional Alias enhancements (chapter 5.9a)," 3GPP TSG-SA WG1 Meeting #81, S1-180565, Mar. 2018, Retrieved from the Internet: URL:http://www.3gpp.org/ftp/Meeting%5F3GPP%5FSYNC/SA/Docs/, XP051412074, 9 pages.
"Clarification of text in clause 5.4.1," 3GPP TSG-SA WG1 Meeting #75, S1-162412, Sep. 2016, Retrieved from the Internet: URL:http://www.3gpp.org/ftp/tsg%5Fsa/TSG%5FSA/TSGS%5F73/Docs/SP%2D161605%2Ezip, XP051679328, 2 pages.
"Enhanced control of User Regroup and Private Communication," 3GPP TSG-SA WG1 Meeting #81, S1-180037, Mar. 2018, Retrieved from the Internet: URL:http://www.3gpp.org/ftp/tsg%5Fsa/TSG%5FSA/TSGS%5F79/Docs/SP%2D181801%2Ezip, XP051532047, 34 pages.

(Continued)

*Primary Examiner* — Omoniyi Obayanju
(74) *Attorney, Agent, or Firm* — Pillsbury Winthrop Shaw Pittman LLP

(57) ABSTRACT

A communication network enabling a plurality of user devices to access communication services, the communication being a private communication or a communication within a multimedia group to which at least one user device of the plurality of user devices is affiliated, the communication network including at least one dedicated signalling group making it possible to announce to at least one user device of the plurality of user devices affiliated to the dedicated signalling group the availability of at least one service for the dedicated signalling group.

10 Claims, 2 Drawing Sheets

(56) References Cited

OTHER PUBLICATIONS

"Group affiliation correction," 3GPP TSG-SA WG6 Meeting #25, S6-181012, Jul. 2018, Retrieved from the Internet: URL:http://www.3gpp.org/ftp/Meetings%5F3GPP%5FSYNC/SA6/Docs, XP051471134, 22 pages.

* cited by examiner

[Fig. 1]
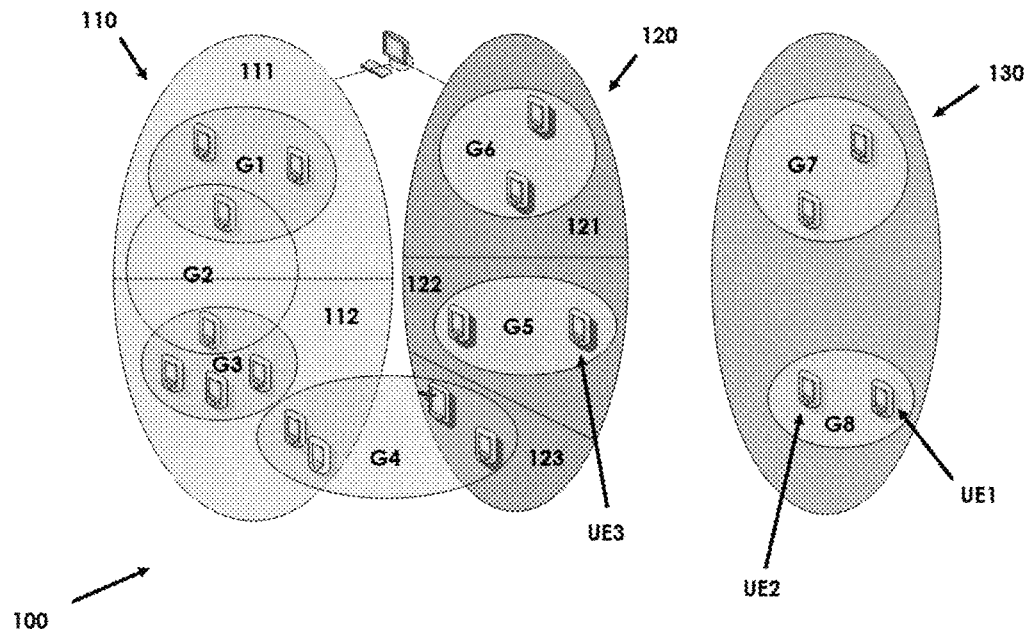
[Fig. 2]
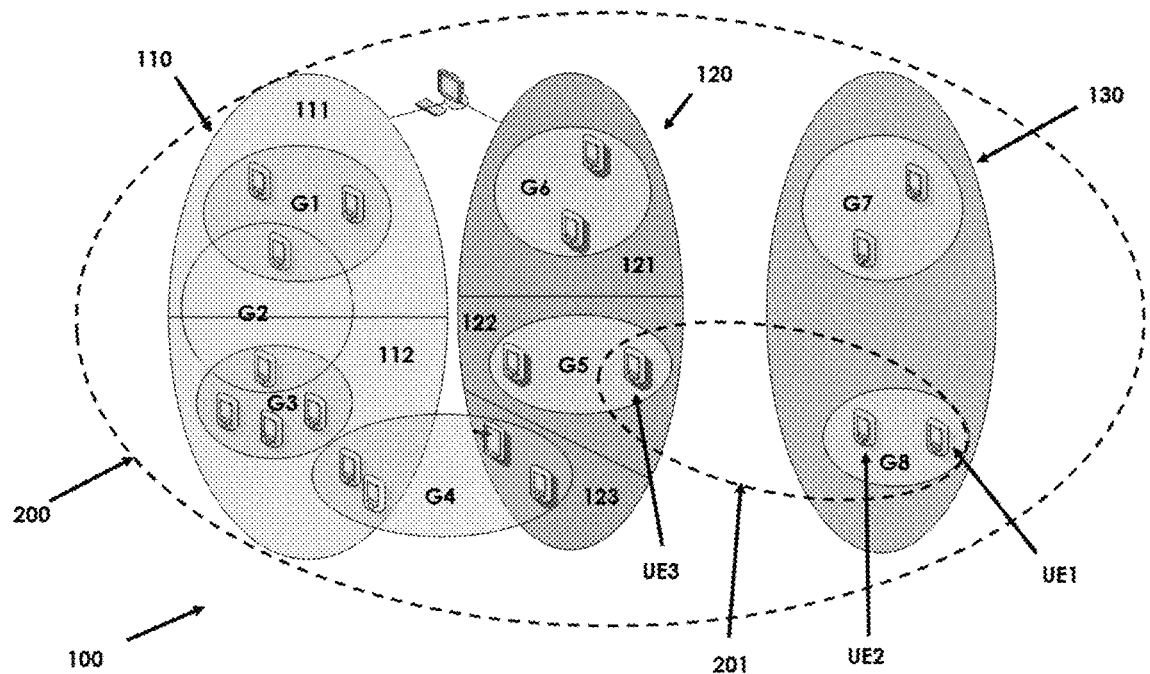

[Fig. 3]
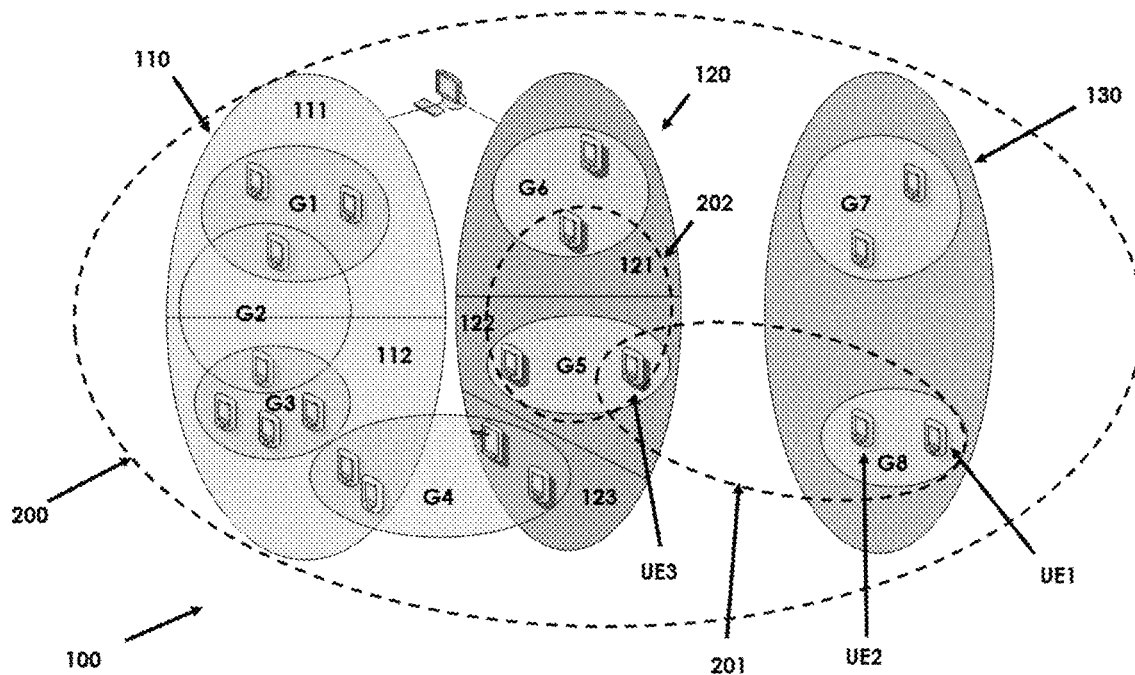

COMMUNICATION NETWORK COMPRISING SIGNALLING GROUPS

CROSS-REFERENCE TO RELATED APPLICATIONS

This application claims priority to French Patent Application No. 1904388, filed Apr. 25, 2019, the entire content of which is incorporated herein by reference in its entirety.

FIELD

The technical field of the invention is that of communication networks and more particularly that of the announcement of services available to users within communication networks.

The present invention relates to a communication network and more particularly a communication network comprising signalling groups making it possible to announce service availabilities to users.

BACKGROUND

The TETRAPOLe, TETRA® or P25® professional mobile radio (PMR) radiocommunication standards make it possible to announce the availability of one or more services to user devices when they are situated in a certain zone, or when they enter into a certain zone. These localised announcements are made via the radio cover of the base stations of the network: when it is wished to announce that a service is available to a user situated at a certain location, it suffices to send a signalling message to a base station covering this location, which broadcasts it to the user devices in the radio zone that it covers. These communications use a radio control channel making it possible to perform radio signalling.

A user device receiving a signalling message has available an embedded intelligence and may then decide if it is capable of using the announced service and/or if it is authorised to do so thanks to parameters attached to the signalling message. For example, a user device located at the scene of an important event may receive a service announcement comprising parameters defining a level of rights of the user to use the announced service. The user device is then in a position to verify if the user with which it is associated has a sufficient level of rights or not. The user device will then be in a position to use the announced service if the user with which it is associated has a sufficient level of rights. Otherwise, it will not be in a position to use the announced service.

In the 3GPP standard governing mobile networks of GSM (Global System for Mobile communications) type and more particularly in deployments resorting to critical communication services defined by the 3GPP called MCS (Mission Critical Services), such service announcements are not provided. Indeed, the 3GPP MCS standard defines communication protocols at the applicative level, it is thus not possible to know a network coverage for example, nor to use radio control channels. Indeed, radio control channels are common and known to all users whatever the configuration of the groups and whatever the organisation to which they are attached, and represent geographic signalling zones. In the 3GPP MCS standard, there is no equivalent function provided and it is not simple to address a signalling message to all user devices in a certain zone. It is not simple either to announce a service availability to one or more users. Indeed, solutions make it possible to address these two problems and have drawbacks. To address a signalling message to all the user devices in a certain zone, there exist roundabout means at the applicative level based on the location, for example of mapping type, jointly with the creation of an ad hoc group. This solution is not automatic nor immediate. In addition, if a user enters into this zone, then the ad hoc group is no longer up to date. This dynamic notion cannot be managed by the current specifications of the 3GPP MCS.

Signalling messages such as an emergency alert or an imminent peril alert are provided by the 3GPP MCS, but these alerts are addressed individually to the user devices.

FIG. 1 shows a schematic representation of a PMR network of the prior art.

It may be observed in FIG. 1 that the network 100 comprises several user devices (UE1, UE2) belonging to organisations 110, 120 and 130 and/or to sub-organisations 111, 112, 121, 122 and 123. The user devices are affiliated to communication groups. For example, the user device UE1 is affiliated to the communication group G8, in the same way as the user device UE2. The user device UE3 is affiliated to the communication group G5.

An emergency alert is an alert sent by a user device when its user is in danger. For example, in FIG. 1, the user device UE1 sends an emergency alert. The user device UE1 belongs to the communication group G8, which has been designated, for example by an operator, as being a "dedicated emergency group" of the user device UE1 such as described in the Technical Specification 3GPP Revision 16 (Rel.16) TS 23.280 v16.2.0 of March 2019. The emergency alert is sent to each user device of the communication group G8 designated as being the "dedicated emergency group" of the user device UE1. The emergency alert is thus sent to the user device UE2 because it is affiliated to G8.

However, this communication group G8 does not make it possible to announce the availability of services, for example to inform a user that he is located in a zone where an emergency is occurring and that he could join a communication group assigned to the management of this emergency. Indeed, the communication groups have been created previously and the "dedicated emergency group" has been designated previously among the communication groups. Two users who thus do not have a communication group in common thus could not for example be both informed of an emergency triggered by a user device.

For example, in FIG. 1, the two users using the two user devices UE2 and UE3 could not both be informed of the emergency alert triggered by the user device UE1 because they do not both belong to the communication group G8 which has been designated as "dedicated emergency group". However, if the organisation 120 is for example a fire brigade, and if the organisation 130 is for example a police force, it could have been interesting for the user device UE3 to be informed of the distress of UE1 even if it does not belong to its communication group G8.

A "silo effect" appears linked to the communication groups. Indeed, a user does not necessarily need to communicate and thus to be in a communication group with certain other user devices. In certain cases, for confidentiality reasons, it may even have not to be in the same communication group as certain other user devices. For example, it may be prohibited for the user devices UE3 and UE2 to be able to communicate, and thus to be in the same communication group for reasons of confidentiality. This does not make it possible to be able to inform the two user devices of an event for example.

In addition, this principle does not make it possible to send signalling messages to user devices located in a given zone because the user devices cannot be located.

Finally, it is not simple in the 3GPP MCS standard to send announcement messages of availability of services for a user or a group of users.

There thus exists a need for a user to be able to receive announcement messages of availability of services as a function of his location, his roles or his rights.

SUMMARY

An aspect of the invention offers a solution to the aforementioned problems, by enabling announcements of availability of service as a function of one or more parameters, to one or more user devices not necessarily belonging to the same communication groups.

An aspect of the invention relates to a communication network enabling a plurality of user devices to access communication services, the communication being a private communication or a communication within a multimedia group to which at least one user device of the plurality of user devices is affiliated, the communication network further including at least one dedicated signalling group to which at least one user device of the plurality of user devices is affiliated, the dedicated signalling group making it possible to announce to each user device affiliated to the dedicated signalling group the availability of at least one service.

Thanks to the invention, it is possible to announce the availability of a service to at least one user device. In addition, it is possible to announce the availability of this service as a function of a parameter. Indeed, the dedicated signalling groups make it possible to multicast the service availability announcement to all the user devices affiliated to this group, which makes it possible to add embedded intelligence in the user devices. Thanks to the invention, each user device of the dedicated signalling group receives the service availability announcement and may then decide if it is capable and/or authorised to use this service. The groups being dedicated to signalling, they make it possible to announce the availability of a service to a plurality of user devices having for example a same characteristic, for example a same hierarchic level, or for example belonging to a same organisation. Thus, two users belonging to a same organisation, for example a railway company, but not having any communication group in common because working for example in different trades, may both receive a service availability announcement while belonging to the same dedicated signalling group, for example because they have a same hierarchic level in the organisation.

An aspect of the invention makes it possible to avoid the "silo effect" linked to communication groups. Indeed, a user does not necessarily need to communicate and thus to be in a communication group with certain other user devices. In certain cases, for reasons of confidentiality, he may even have not to be in the same communication group as certain other user devices. However, he may have need to receive a service availability announcement also intended for these other user devices. The dedicated signalling groups of the invention enable these announcements without having to create a communication group. Thus, the dedicated signalling groups are invisible to the user and enable better organisation and management of announcements of availability of service without having to be concerned about problems of confidentiality.

Apart from the characteristics that have been mentioned in the preceding paragraph, the communication method according to an aspect of the invention may have one or more complementary characteristics among the following, considered individually or according to all technically possible combinations thereof:

- the communication network is a communication network according to the 3GPP MCS standard.
- the at least one user device of the plurality of user devices is affiliated to at least one second dedicated signalling group.
- the affiliation of at least one user device of the plurality of user devices to at least one dedicated signalling group is done by implicit affiliation.
- the dedicated signalling groups are defined by configuration of the communication network.
- the availability of at least one service for a dedicated signalling group is announced by the sending of a service availability announcement to each user device affiliated to the dedicated signalling group.
- the service availability announcement comprises at least one parameter among location and functional address parameters.
- the service availability announcement is sent to a plurality of dedicated signalling groups.
- the service availability announcement announces the availability of at least one service among the services of emergency alert, imminent peril, private communication, multicast group communication, system communication, ambient viewing group and ambient listening group.
- the service availability announcement is sent periodically.
- the communication network comprises at least one signalling group associated with a location.

A benefit of affiliation to several dedicated signalling groups of a same user device is that it can receive service availability announcements of different types and for different reasons: for example, because it belongs to a dedicated signalling group encompassing users of same hierarchic level as it and for example because it belongs to a group encompassing users able to provide assistance.

A location may be added to the service availability announcement beneficially making it possible to cross reference a parameter such as for example that which defines the user by his belonging to the dedicated signalling group to which the announcement has been sent such as for example his capacity to provide assistance for example by being a fireman with the location in order to only announce the availability of a service to users situated at this location.

The invention and the different applications thereof will be better understood on reading the description that follows and by examining the figures that accompany it.

BRIEF DESCRIPTION OF THE FIGURES

The figures are presented for indicative purposes and in no way limit the invention.

FIG. 1 shows a schematic representation of a PMR network of the prior art.

FIG. 2 shows a schematic representation of a communication network comprising dedicated signalling groups according to an embodiment of the invention.

FIG. 3 shows a schematic representation of a communication network comprising dedicated signalling groups according to an embodiment of the invention.

DETAILED DESCRIPTION

The figures are presented for indicative purposes and in no way limit the invention.

Unless stated otherwise, a same element appearing in the different figures has a single reference.

FIG. 2 shows a schematic representation of a communication network comprising dedicated signalling groups according to the invention.

"Communication network" is taken to mean a network making it possible to access communication services, that is to say services linked to communication, for example access to audio, video or instead to messaging with files to interact with one or more user devices. The communication services make it possible to establish private communications between two user devices or group communications between user devices affiliated to a same multimedia group.

"Multimedia group" is taken to mean a virtual group encompassing several user devices being able to interact with each other once authenticated via a server of the communication network enabling access to the multimedia group.

The communication network 100 represented in FIG. 2 comprises a plurality of dedicated signalling groups. The communication network 100 comprises a dedicated signalling group 200 to which all the user devices of the communication network 100 are affiliated. This makes it possible to announce the availability of services to all the user devices of the communication network 100. The group being dedicated to signalling, it makes it possible not to have to create a communication group encompassing all the user devices of the network and thus to respect confidentiality rules and to simplify the management of the communication network 100.

The signalling groups 200 and 201 are created by an operator of the communication network 100. A communication network 100 may comprise several dedicated signalling groups. The operator(s) having created them may have made the choice of reflecting the partitioning of the organisations 110, 120 and 130, for example by creating a dedicated signalling group for each organisation 110, 120 and 130, and by further creating a dedicated signalling group by sub-organisation 111, 112, 121, 122 and 123. The operator may also create dedicated inter-organisational signalling groups like the dedicated signalling group 201.

Thus, the dedicated signalling groups according to an embodiment of the invention make it possible to reflect the partitioning and the hierarchy of the organisations within which they are implemented, while respecting confidentiality criteria while not enabling communication between all the user devices of the communication network 100.

The dedicated signalling groups are signalling data exchange groups. Thus, they do not exchange media such as video or voice. For example, in the case of a communication network according to the 3GPP MCS standard, they are data exchange groups of "MCData" type. "Communication network according to the 3GPP MCS standard" is taken to mean a communication network compatible with the 3GPP MCS standard and more particularly with the current version of the 3GPP which is version 15, with the preceding versions from version 13 and with the following versions integrating all the characteristics of the invention One or more user devices are affiliated to the dedicated signalling groups created by the operator, either by being affiliated implicitly as the 3GPP MCS standard allows, that is to say while being affiliated forcedly by the system governing the network, or by choosing to be affiliated to a dedicated signalling group. The user not having knowledge of the signalling groups to which he is affiliated, the user device chooses to affiliate itself or not to a dedicated signalling group, when the affiliation is not forced on it, by implementing, for example by a processor of the user device, an algorithm recorded in a memory of the user device.

The communication network may be fixed, for example a communication network covering a company, or mobile, for example tactical, that is to say used in the case of a special forces mission.

A user device UE1, UE2 and UE3 is for example a smartphone, a tablet, a portable computer or any other device making it possible to communicate within a network.

Group "dedicated to signalling" is taken to mean a group of user devices only enabling the transmission of signalling messages, for example control messages, service availability announcement messages, or any other type of messages enabling the establishment of communications within the network and the management of the network. The service availability announcement messages may be for example notifications.

The communication network 100 comprises another dedicated signalling group 201 comprising the user devices UE1 and UE2 affiliated to the communication group G8 and UE3 affiliated to the communication group G5.

The dedicated signalling groups 201 make it possible to avoid the "silo effect" encountered when user devices are found in different organisations 120 and 130 and in different communication groups G5 and G8. Thanks to the dedicated signalling group 201, the user devices UE1, UE2 and UE3 may receive signalling messages enabling for example the announcement of the availability of one or more services.

The signalling messages may be sent by user devices of the communication network 100, by a server of the network, by a network supervisory device or by any other device connected to the network.

A service availability announcement is sent to one dedicated signalling group or to several dedicated signalling groups.

These services may be any service that need to be announced to the user device, such as for example services of emergency alert, imminent peril, private communication, multicast group communication, system communication, group ambient viewing and group ambient listening.

For example, in the case of so-called "legacy" services, that is to say services that already exist for example in the 3GPP MCS standard, such as emergency or imminent peril alerts, the dedicated signalling groups make it possible to announce that one of the user devices of the dedicated signalling group is in distress or that a peril is imminent for several user devices which could not necessarily be affiliated to a same communication group.

In the case of private communications or multicast group communications, this may make it possible for example to announce that a call is underway and to propose to a user device to join the communication with user devices that are not necessarily in one of its communication groups. This makes it possible to announce the availability of a traditional service, that is to say already known, to several user devices not necessarily being in the same communication group.

Thus, in the case for example of a communication network within an airport, the users are designated by their profession (baggage handler, security agent, pilot, crew, fireman, etc.) and work on different flights throughout the day. The users choose their flight as a function of their flight planning. Each user must be able to communicate with all the other users having the same trade or the same flight, or having the same trade as said user on the same flight.

Thanks to the dedicated signalling groups, a service availability announcement may be sent to all the users having the same trade, having the same flight, or having the same trade and the same flight thanks to one or more parameters of the service availability announcement. This parameter may for example be a functional address. "Functional address" is taken to mean an identifier for example linked to a profession, such as a trade code, linked to a flight, such as a flight code or any other identifier making it possible to address a user device. This service availability announcement may announce the availability of a private communication or a group communication between all the users having the same trade and propose to each user having the same trade to join said private communication. Thus, even if users having the same trade were not found in the same communication group, they may join a group thanks to this announcement.

The announcement of availability of a private communication or of a group communication may be sent to all the user devices, each user device then deciding, for example by means of an algorithm recorded in a memory (e.g. a non-transitory memory) and implemented by a processor (e.g. a processor that includes electronic circuitry) of the user device, if it meets the criteria given by the parameter(s) comprised in the service availability announcement and thus if it has to join the announced communication.

The dedicated signalling groups further enable announcements of availability of "new generation" services, such as multimedia services. For example, these services may be group ambient viewing and group ambient listening services, such as defined in the 3GPP MCS standard. Thanks to an embodiment of the invention, these services are no longer addressed individually to the user devices but it is possible to address a plurality of user devices.

A group ambient viewing service enables an operator device such as a "dispatcher", i.e. a fixed control room operator device making it possible to communicate with user devices and/or the management of the network, mainly from control rooms, to live access video streams from a user device. The user may or may not be informed of the reception of the video stream by the control room.

A group ambient listening service enables a control room operator device to live access audio streams from a user device. The user may or may not be informed of the reception of the audio stream by the control room.

These two multimedia services may be announced to one or more user devices affiliated to one or more dedicated signalling groups from for example a fixed device or from another user device. The dedicated signalling groups beneficially make it possible to receive audio and/or video streams from user devices thanks to signalling messages such as announcement messages of availability of ambient viewing group or ambient listening group services. Thus, each user device receiving the service availability announcement, that is to say each user device affiliated to the dedicated signalling group(s) that receive the announcement may decide or not to use this announced service.

A user device decides to use a service either by processing the signalling message, received because it is affiliated to a dedicated signalling group that is a recipient of the signalling message, by an algorithm recorded in a memory and implemented by a processor, or by asking the user of the user device if he chooses to use the announced available service.

For example, in the case of a multicast group communication announced as available to a dedicated signalling group, the user devices affiliated to the dedicated signalling group may ask the user, for example by a message displayed on a screen of the user device, if the user wishes to join the multicast communication.

In another example, in the case of a group ambient viewing service, it may be necessary that the user does not know that the service is available and that the user device uses the announced available service, for example for discretionary reasons. In this case, the user device having at its disposal an embedded intelligence, for example an algorithm in the internal memory and implemented by a processor, decides by itself to use or not this service, for example as a function of parameters comprised in the service availability announcement.

The service availability announcement may comprise one or more parameters, making it possible to cross reference several parameters and thus to only address a certain number or a precise type of user devices.

For example, the service availability announcement may comprise a location parameter.

In the case of an emergency call service, the emergency call service announcement may comprise the location of the user device from which the emergency call has originated. This makes it possible to locate the user device from which the emergency call has originated and thus to locate the event.

The manner in which the user devices know and/or recover their location is not the object of the invention. This may be done in a manner known to those skilled in the art, for example from a GPS (Global Positioning System).

A service availability announcement comprising a location is sent to all the user devices of one or more dedicated signalling groups, whatever their location.

A user device receiving a service availability announcement comprising a location uses its embedded intelligence, for example an algorithm implemented by a processor recorded in a memory, to decide if the service is available for it. The algorithm of the user device recovers for example its position and reads the location comprised in the service availability announcement. It then analyses if its position is close to the location comprised in the service availability announcement received.

Its position is "close" to the location comprised in the service availability announcement is taken to mean when the position of the user device is within a radius below a predetermined value with respect to the location comprised in the service availability announcement. This predetermined radius value may be recorded in a memory of the user device, for example configured by an operator, or may be comprised in the service availability announcement.

Thus, all the user devices affiliated to the dedicated signalling group will receive the service availability announcement via the dedicated signalling group encompassing for example firemen, the announcement comprising the location of the event. Only user devices situated in the location will then be able to use the service. This makes it possible for example in this case to announce the possibility of joining a multicast group conversation between firemen situated in the location where an event has occurred, or to announce the event only to users close to the position of the sender.

Concerning ambient group viewing or ambient group listening services, the location comprised in the service availability announcement is the location that the sender has targeted as being the zone that it wishes to see or listen to.

In a service availability announcement comprising a location, the location may be added either by the sender or by a device of the network such as a server.

The location comprised in a service availability announcement may make it possible to create a service zone.

For example, when a user device enters into this zone, it may be notified of a service available in this zone.

This may be done in several ways. The system may detect that a user device has entered into the zone and automatically affiliated the user device to a dedicated signalling group linked to this zone. The manner in which the system detects that a user device has entered into the zone does not form part of the object of the invention. Once affiliated, the user device may receive the service availability announcement and use the announced service. Thus, a dedicated signalling group is associated with a location.

Another way may be to send periodically the service availability announcement to a plurality of user devices affiliated to already existing dedicated signalling groups. Each user device then verifies periodically if it is within the zone of the service availability announcement and may then use the service if it is within the zone.

Another parameter that may be comprised in a service availability announcement is for example a hierarchy level parameter, for example the rights of the user, or a parameter linked to the service, for example the remaining amount of battery power of the user device if the service consumes battery power.

In the case of a persistent service, that is to say a service being able to be used for quite a long time, for example several hours or several days, the service availability announcements may be sent periodically, for example every minute or every hour. This enables a user device having affiliated itself recently to a dedicated signalling group to receive the service availability announcement even if it has only joined the dedicated signalling group after the first sending of the announcement.

FIG. 3 shows a schematic representation of a communication network comprising dedicated signalling groups according to the invention.

In FIG. 3, a same user device UE3 is affiliated to several dedicated signalling groups 200, 201 and 202.

All the user devices of the communication network 100 are affiliated to the dedicated signalling group 200. Thus, it is possible to announce an availability of service to all the user devices of the communication network 100.

The user devices UE1, UE2 and UE3 are affiliated to the same dedicated signalling group 201, making it possible to announce to them an availability of service even though they are not all in the same communication groups.

The user device UE3 is further affiliated to the dedicated signalling group 202, making it possible to announce to it the availability of a service that the other user devices UE1 and UE2 of the dedicated signalling group 201 are not authorised to use and/or cannot use.

This makes it possible to respect confidentiality criteria, while belonging to several dedicated signalling groups having different levels of confidentiality of the announced services, while not having a communication group between certain user devices, for example between the user devices UE1 and UE3.

Thus, a benefit of signalling groups is that they make it possible to address a plurality of user devices and to address a restricted number of user devices as a function of the announced service and the needs, and thus a granularity of the announcements while avoiding the silo effect of communication groups and while respecting confidentiality criteria.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A communication network according to 3rd Generation Partnership Program Mission-Critical System standard, comprising:
   a plurality of user devices, wherein one or more first user devices of the plurality of user devices belong to a first communication group of the communication network and one or more second user devices of the plurality of user devices belong to a second communication group of the communication network, the communication network being configured to enable the plurality of user devices to access communication services, the communication services being for private communication or for communication within a communication group,
   a server enabling access to the communication group, each of the first and second communication groups being a virtual group encompassing several user devices adapted to interact with one another once authenticated via the server of the communication network, wherein the first and second communication groups are different communication groups such that communications between the one or more first user devices of the first communication group and the one or more second user devices of the second communication group are not enabled,
   at least one first dedicated signalling group to which at least one first user device of the one or more first user devices of the first communication group and at least one second user device of the one or more user devices of the second communication group are affiliated, the at least one first dedicated signalling group being invisible to users of the at least one first user device and the at least one second user device, the at least one first dedicated signalling group making it possible to announce, via at least one service announcement sent to each of the at least one first user device and the at least one second user device affiliated to said at least one first dedicated signalling group, the availability of at least one service of the communication services, the at least one service announcement comprising at least one parameter related to said at least one service, each user device of the at least one first user device and the at least one second user device comprising a processor and a memory encoded with instructions, each user device of the at least one first user device and the at least one second user device being adapted to, upon receiving the at least one service announcement, execute the instructions to determine the use of the at least one service when the at least one parameter satisfies a condition with respect to at least one reference parameter.

2. The communication network according to claim 1, wherein the at least one first user device of the one or more first user devices of the first communication group is affiliated to at least one second dedicated signalling group.

3. The communication network according to claim 1, wherein the affiliation of the at least one first user device of the one or more first user devices of the first communication group and of the at least one second user device of the one or more of user devices of the second communication group to the at least one first dedicated signalling group is done by implicit affiliation.

4. The communication network according to claim 1, wherein the at least one first dedicated signalling group is defined by configuration of the communication network.

5. The communication network according to claim 1, wherein the at least one parameter is at least one of a location and functional address parameters.

6. The communication network according to claim 1, wherein the service availability announcement is sent to a plurality of dedicated signalling groups.

7. The communication network according to claim 1, wherein the service availability announcement announces the availability of at least one service among the services of emergency alert, imminent peril, private communication, multicast group communication, system communication, ambient viewing group and ambient listening group.

8. The communication network according to claim 1, wherein the service availability announcement is sent periodically.

9. The communication network according to claim 1, comprising at least one signalling group associated with a location.

10. The communication network according to claim 1, wherein at least one user device of the first communication group is not affiliated to the at least one first dedicated signalling group such that said at least one user device of the first communication group is not adapted to receive the at least one service announcement.

* * * * *